(No Model.)
F. W. KETNER.
DENTAL ENGINE ATTACHMENT.
No. 588,444.   Patented Aug. 17, 1897.
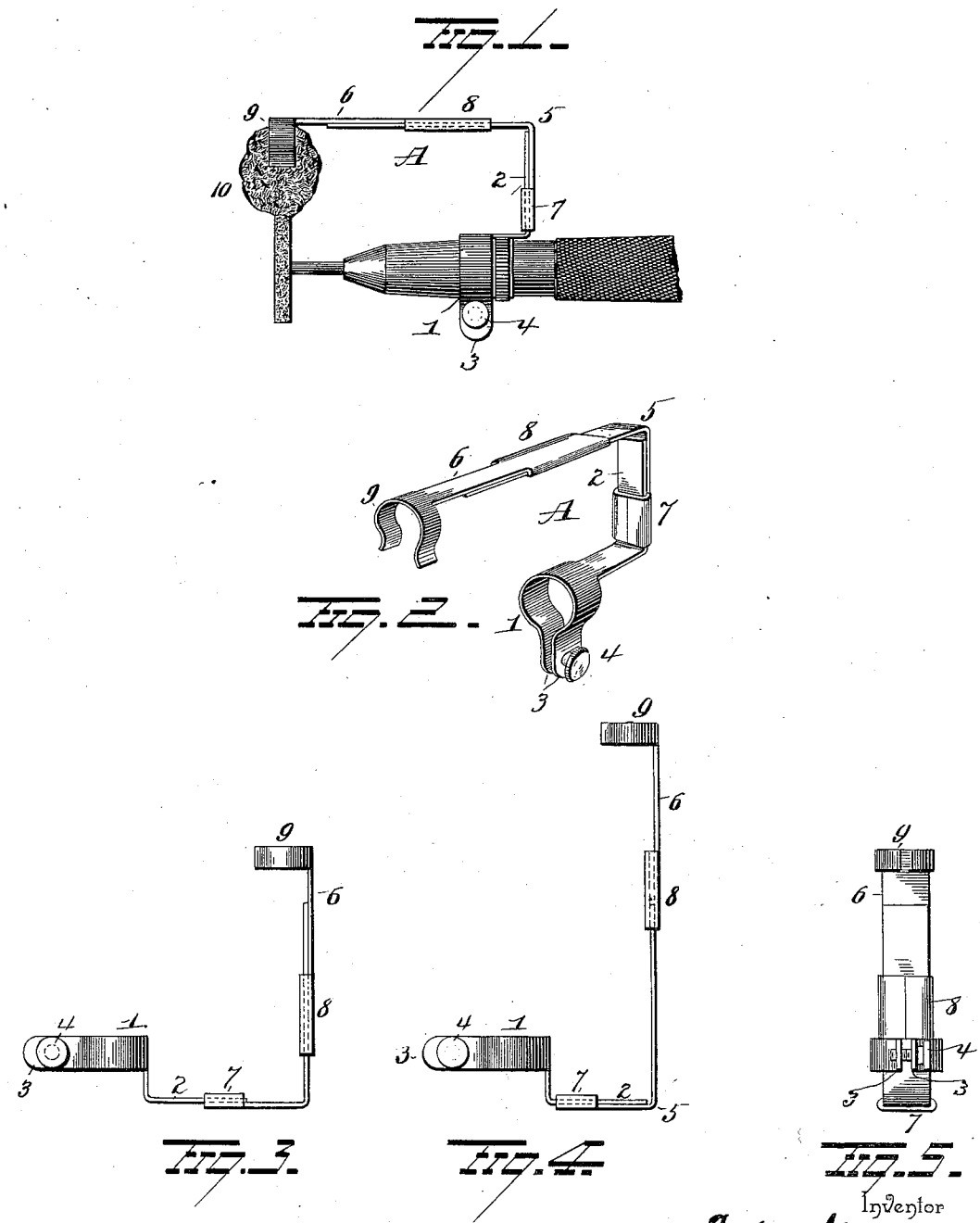
Witnesses
E. J. Nottingham
G. F. Downing
Inventor
F. W. Ketner
By H. A. Seymour
Attorney

UNITED STATES PATENT OFFICE.

FRANK W. KETNER, OF HUDSON, NEW YORK.

DENTAL-ENGINE ATTACHMENT.

SPECIFICATION forming part of Letters Patent No. 588,444, dated August 17, 1897.

Application filed January 16, 1897. Serial No. 619,456. (No model.)

*To all whom it may concern:*

Be it known that I, FRANK W. KETNER, of Hudson, in the county of Columbia and State of New York, have invented certain new and useful Improvements in Attachments for Dental Engines; and I do hereby declare the following to be a full, clear, and exact description of the invention, such as will enable others skilled in the art to which it appertains to make and use the same.

My invention relates to an improvement in attachments for dental engines, the object being to provide a simple and inexpensive device for moistening and cleaning corundum-stones; and it consists of a construction capable of being extended or contracted horizontally and vertically and designed to be removably attached to the handpiece of a dental engine.

My invention further consists in certain novel features of construction and combinations of parts, as will be hereinafter more fully described, and pointed out in the claim.

In the accompanying drawings, Figure 1 represents a view of my improvement in its operative position on the handpiece of a dental engine. Fig. 2 is a detached view of the same with sponge removed. Figs. 3, 4, and 5 are views in elevation.

A represents my improved attachment, and it consists of a split collar 1, having an upwardly-projecting arm 2 and parallel free ends 3, and provided with a thumb-screw 4, passing through said parallel ends for securing the device in its operative position.

Mounted on the arm 2 is an adjustable bracket, the bracket and arm being connected by a telescopic connection, whereby the bracket may be adjusted toward or away from collar 1. This bracket is preferably constructed in two separate parts, one of which will be designated as member 5, while the other will be termed member 6. The vertical arm of member 5 is in the present instance provided, beginning at its free end, with a socket 7, which moves on the projecting arm 2 of collar 1, whereby a vertical adjustment of the bracket toward or away from the collar 1 is secured, as already stated. Member 6 is also provided with a socket 8, similar to socket 7, within which moves the horizontal arm of member 5, thus enabling the bracket to be extended or contracted in a horizontal direction. The free or forward end of member 6 is provided with a spring-clasp 9, within which is supported or retained the moistening material or sponge 10.

The attachment above described is particularly adapted for use on dental engines during the operation of cutting down teeth, both artificial and natural, either in crown or bridge work.

When operating in a patient's mouth, it has heretofore been the practice to dip the stone in water at frequent intervals, in order to keep the stone in a moist condition, and also for the purpose of cleansing the stone. By this method of moistening the stone the material ground from the teeth was left in the patient's mouth, which necessitated a constant rinsing of the mouth, thus greatly prolonging the operation. The frequent dipping of the stone into water is also objectionable on the ground that the superfluous water taken on the stone is thrown into the face of both the operator and patient.

It is evident from the foregoing description of my improvement that the stone will be kept constantly moist by reason of its uninterrupted contact with the moistener and cleaner, and in view of this fact the powdered substance adhering to the revolving stone will be taken up by said moistener and cleaner, and hence the objections above set forth will be overcome. The moistener and cleaner may be cleansed and moistened by dipping it into water, or it may be replaced when worn out by simply opening the clasp and removing it out of engagement therewith.

This attachment is designed to be removably secured to the tool-holder or to such part of the dental engine adjacent thereto as may be most convenient to the operator, and owing to its simplicity of construction its removal can be easily and quickly accomplished when desired.

The adjustability of the attachment is one of the most important features of my invention, as will be more clearly seen by reference to Figs. 3, 4, and 5 of the drawings.

The corundum or emery stones used for grinding teeth vary in diameter, and hence it will be seen that by providing for both a vertical and horizontal adjustment of the bracket the moistening material or sponge can be easily and quickly brought into a position to moisten and clean said corundum or emery stones.

It is evident that changes in the construction and relative arrangement of the several parts might be made without avoiding my invention, and hence I would have it understood that I do not restrict myself to the particular construction and arrangement of parts shown and described; but, Having fully described my invention, what I claim as new, and desire to secure by Letters Patent, is—

An attachment for dental engines consisting of a collar constructed to be secured to the engine, and an arm connected therewith and extensible in two directions at right angles to each other and provided at its outer end with a spring-clasp adapted to hold a sponge for wiping and moistening the emery-wheel of the engine.

In testimony whereof I have signed this specification in the presence of two subscribing witnesses.

FRANK W. KETNER.

Witnesses:
C. W. BOSTWICK,
SY SOUTHARD.